(12) United States Patent
Sakamoto et al.

(10) Patent No.: US 9,340,953 B2
(45) Date of Patent: May 17, 2016

(54) CONSTRUCTION MACHINE

(71) Applicant: HITACHI CONSTRUCTION MACHINERY CO., LTD., Bunkyo-ku, Tokyo (JP)

(72) Inventors: Hiroshi Sakamoto, Tokyo (JP); Masatoshi Hoshino, Ibaraki (JP); Shinji Ishihara, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/410,350

(22) PCT Filed: Jun. 19, 2013

(86) PCT No.: PCT/JP2013/066832
§ 371 (c)(1),
(2) Date: Dec. 22, 2014

(87) PCT Pub. No.: WO2013/191205
PCT Pub. Date: Dec. 27, 2013

(65) Prior Publication Data
US 2015/0337521 A1 Nov. 26, 2015

(30) Foreign Application Priority Data
Jun. 22, 2012 (JP) .................................. 2012-141379

(51) Int. Cl.
*E02F 9/20* (2006.01)
*B60K 6/485* (2007.10)
(Continued)

(52) U.S. Cl.
CPC ............... *E02F 9/2075* (2013.01); *B60K 6/485* (2013.01); *B60W 10/08* (2013.01); *B60W 10/30* (2013.01);
(Continued)

(58) Field of Classification Search
CPC ...... E02F 9/2058; E02F 9/2062; E02F 9/2075; E02F 9/2246; E02F 9/2264; E02F 9/2271; E02F 9/2091; E02F 9/2296; B60K 6/485; B60W 10/04; B60W 10/06; B60W 10/08; B60W 20/00; B60W 20/10; B60W 10/30; F02D 29/04; F02D 29/06; F02D 41/0205
USPC ........................ 180/65.26, 305, 306, 307, 308
See application file for complete search history.

(56) References Cited

U.S. PATENT DOCUMENTS

| | | | |
|---|---|---|---|
| 6,820,356 B2 * | 11/2004 | Naruse | E02F 9/2221 37/348 |
| 9,022,749 B2 * | 5/2015 | Akiyama | E02F 9/123 417/212 |

FOREIGN PATENT DOCUMENTS

| | | |
|---|---|---|
| JP | 2003-28071 A | 1/2003 |
| JP | 2004-11502 A | 1/2004 |
| JP | 2005-83242 A | 3/2005 |

OTHER PUBLICATIONS

Mechanical translation of JP2003-28071, Jan. 29, 2003.*

*Primary Examiner* — John Walters
(74) *Attorney, Agent, or Firm* — Baker Botts L.L.P.

(57) ABSTRACT

Provided is a construction machine which is capable of suppressing useless power consumption. This construction machine is provided with an excavator body, a working device which is attached to the excavator body, an engine which is mounted in the excavator body, a generator motor which is attached to the engine and which can be driven as an electric generator or an electric motor, a hydraulic pump which is driven by the engine and the generator motor, a hydraulic actuator which drives the working device with motive power generated by the hydraulic pump, and a control portion which lowers the drive output of the generator motor in accordance with the drive state of the working device and limits the drive output of the hydraulic pump in order to keep the rotation frequency of the engine within a range of predetermined values.

9 Claims, 10 Drawing Sheets

(51) Int. Cl.
*B60W 10/08* (2006.01)
*B60W 10/30* (2006.01)
*B60W 20/00* (2016.01)
*F02D 29/04* (2006.01)
*F02D 29/06* (2006.01)
*E02F 9/22* (2006.01)
*F02D 41/02* (2006.01)

(52) U.S. Cl.
CPC .............. *B60W 20/00* (2013.01); *E02F 9/2091* (2013.01); *E02F 9/2246* (2013.01); *E02F 9/2296* (2013.01); *F02D 29/04* (2013.01); *F02D 29/06* (2013.01); *F02D 41/0205* (2013.01); *B60W 2710/0644* (2013.01); *F02D 2200/503* (2013.01); *Y02T 10/6226* (2013.01); *Y10S 903/93* (2013.01)

FIG. 7A

| No. | PREVIOUS DETERMINATION | CONDITIONS | DETERMINATION FLAG |
|---|---|---|---|
| 1 | OFF *NON-RELIEF | STATE INDICATING PUMP DISCHARGE PRESSURE ≥ RELIEF PRESSURE−$\alpha$ IS KEPT FOR DETERMINED TIME | ON *RELIEF |
| | | OTHER THAN THAT ABOVE | OFF *NON-RELIEF |
| 2 | ON *RELIEF | STATE INDICATING RELIEF PRESSURE− PUMP DISCHARGE PRESSURE ≥ $\beta$ IS KEPT FOR DETERMINED TIME | OFF *NON-RELIEF |
| | | OTHER THAN THAT ABOVE | ON *RELIEF |

FIG. 7B

| No. | PREVIOUS DETERMINATION | CONDITIONS | DETERMINATION FLAG |
|---|---|---|---|
| 1 | ON *NON-EXCAVATION | WHEN ALL THE FOLLOWING CONDITIONS C1) TO C3) ARE SATISFIED: C1) PUMP DISCHARGE PRESSURE ≥ PREDETERMINED VALUE C2) ARM CROWDING OPERATION AMOUNT ≥ PREDETERMINED VALUE C3) WHEN EITHER OF THE FOLLOWING CONDITIONS C3-1) AND 3-2) IS SATISFIED: C3-1) BOOM RAISING OPERATION AMOUNT ≥ PREDETERMINED VALUE C3-2) BUCKET CROWDING OPERATION AMOUNT ≥ PREDETERMINED VALUE | OFF *EXCAVATION |
| | | OTHER THAN THOSE ABOVE | ON *NON-EXCAVATION |
| 2 | OFF *EXCAVATION | WHEN ALL THE FOLLOWING CONDITIONS C1) AND C2 ARE SATISFIED: C1) PUMP DISCHARGE PRESSURE ≥ PREDETERMINED VALUE C2) ARM CROWDING OPERATION AMOUNT ≥ PREDETERMINED VALUE | OFF *EXCAVATION |
| | | OTHER THAN THOSE ABOVE | ON *NON-EXCAVATION |

FIG. 8A

| No. | PREVIOUS DETERMINATION | CONDITIONS | DETERMINATION FLAG |
|---|---|---|---|
| 1 | OFF *SWINGING | STATE INDICATING \|SWINGING MOTOR ROTATION FREQUENCY\| $\leq \delta$ IS KEPT FOR DETERMINED TIME | ON *SWINGING STOP |
| | | OTHER THAN THAT ABOVE | OFF *SWINGING |
| 2 | ON *SWINGING STOP | STATE INDICATING \|SWINGING MOTOR ROTATION FREQUENCY\| $\leq \gamma$ IS KEPT FOR DETERMINED TIME | OFF *SWINGING |
| | | OTHER THAN THAT ABOVE | ON *SWINGING STOP |

FIG. 8B

| No. | PREVIOUS DETERMINATION | CONDITIONS | DETERMINATION FLAG |
|---|---|---|---|
| 1 | ON *NON-SWINGING PRESSING | WHEN ALL THE FOLLOWING CONDITIONS C1) AND C2) ARE SATISFIED:<br>C1) PUMP DISCHARGE PRESSURE $\geq$ PREDETERMINED VALUE<br>C2) SWINGING OPERATION AMOUNT $\geq$ PREDETERMINED VALUE | OFF *SWINGING PRESSING |
| | | OTHER THAN THOSE ABOVE | ON *NON-SWINGING PRESSING |
| 2 | OFF *SWINGING PRESSING | WHEN ALL THE FOLLOWING CONDITIONS C1) AND C2) ARE SATISFIED:<br>C1) PUMP DISCHARGE PRESSURE $\geq$ PREDETERMINED VALUE<br>C2) SWINGING OPERATION AMOUNT $\geq$ PREDETERMINED VALUE | OFF *SWINGING PRESSING |
| | | OTHER THAN THOSE ABOVE | ON *NON-SWINGING PRESSING |

CONSTRUCTION MACHINE

TECHNICAL FIELD

The present invention relates to a construction machine such as a hydraulic excavator. Particularly, it relates to a construction machine including a generator motor which is attached to an engine, and an electric storage device which can store electric power for driving the generator motor or can be charged with electric power generated by the generator motor.

BACKGROUND ART

A construction machine including hydraulic actuators which drive drive portions such as a boom and an arm with motive power from a hydraulic pump driven by an engine has been heretofore used as this type of construction machine such as hydraulic excavator. However, in recent years, a hybrid type construction machine aimed at improvement of fuel efficiency of an engine, reduction of noise level, and reduction of exhaust gas, etc. has been developed and implemented practically. Specifically, this hybrid type construction machine has a generator motor which is used for assisting the hydraulic pump and which can generate electric power by the engine, and an electric storage device which can supply electric power for driving the generator motor and which can be charged with electric power generated by the generator motor.

In addition, for example, a hybrid working machine described in Patent Literature 1 has been known as a background-art technique in the technical field. Specifically, the working machine described in Patent Literature 1 includes an engine, a hydraulic pump which is driven by the engine, hydraulic actuators which are operated by motive power from the hydraulic pump, and a generator motor which assists motive power to the hydraulic pump. In addition, the working machine includes an electric storage unit which exchanges electric energy with the generator motor. The working machine is configured to limit a motoring torque value of the generator motor in accordance with the residual power level of the electric storage unit. In the Patent Literature 1, configuration is made to suppress accelerative increase of power consumption caused by increase of a current and suppress remarkable decrease of the residual power level caused by the increase of power consumption when a predetermined assist operation is performed in a state in which the residual power level is low.

CITATION LIST

Patent Literature

Patent Literature 1: Japanese Patent No. 3941951

SUMMARY OF INVENTION

Technical Problem

In the construction machine including the hydraulic actuators which drive the drive portions with the motive power from the hydraulic pump as described above, a driver continues a predetermined operation, for example, a warming-up operation. That is, one of the hydraulic actuators such as a boom cylinder is extended to make a full stroke and reach a stroke end at which the hydraulic actuator cannot extend/contract anymore. Thus, a relief valve is operated to increase the oil temperature. In such a case, the flow rate of hydraulic oil discharged from the hydraulic pump and flowing into the relief valve is throttled by the relief valve to thereby generate a pressure loss. The hydraulic oil is warmed by the heat generated from the pressure loss. On this occasion, there is a possibility that the generator motor may continue to assist the hydraulic pump and therefore consume electric power uselessly in the hybrid type construction machine in which the hydraulic pump is driven by the engine and the generator motor.

In addition, in the hybrid working machine described in Patent Literature 1, a motoring torque value of the generator motor is limited in accordance with the residual power level. Therefore, when the residual power level is low during the aforementioned warming-up operation, the assist of the hydraulic pump by the generator motor is limited so that power consumption can be suppressed. However, when the residual power level is high, the assist of the hydraulic pump by the generator motor can be continued to thereby result in useless power consumption.

The present invention has been accomplished in consideration of the aforementioned actual circumstances. An object of the invention is to provide a construction machine which is capable of suppressing useless power consumption which will occur when a generator motor is driven, for example, in a warming-up operation etc.

Solution to Problem

In order to solve the problem, the invention provides a construction machine including: a body; a drive portion which is attached to the body; an engine which is mounted in the body; a generator motor which is attached to the engine and which can be driven as an electric generator or an electric motor; a hydraulic pump which is driven by the engine and the generator motor; a hydraulic actuator which drives the drive portion with motive power generated by the hydraulic pump; and a control portion which lowers a drive output of the generator motor in accordance with a drive state of the drive portion and limits a drive output of the hydraulic pump in order to keep the rotation frequency of the engine within a range of predetermined values.

According to the invention configured thus, the control portion lowers the drive output of the generator motor in accordance with the drive state of the drive portion and limits the drive output of the hydraulic pump in order to keep the rotation frequency of the engine within the range of the predetermined values. Therefore, when, for example, discharge pressure of the hydraulic pump increases and a relief valve operates to bleed off an unnecessary flow rate of hydraulic oil, supply of electric power to the generator motor can be reduced so that the drive output of the generator motor can be decreased. On this occasion, in accordance with the decrease of the drive output of the generator motor, the drive output of the hydraulic pump becomes overloaded and the rotation frequency of the engine decreases. However, the drive output of the hydraulic pump is lowered in order to keep the rotation frequency of the engine within the range of the predetermined values. Accordingly, the rotation frequency of the engine can be kept within the range of the predetermined values. Thus, electric power uselessly consumed by the generator motor can be suppressed.

In addition, in the aforementioned configuration, the construction machine further includes: a pressure control device which operates in accordance with discharge pressure of the hydraulic pump and a pressure detection portion which detects the discharge pressure of the hydraulic pump;

wherein: when the discharge pressure of the hydraulic pump detected by the pressure detection portion reaches a predetermined range which is set in advance relatively to operating pressure at which the pressure control device begins to operate, the control portion lowers the drive output of the generator motor and limits the drive output of the hydraulic pump in order to keep the rotation frequency of the engine within the range of the predetermined values.

With the configuration made thus, the pressure control device operates to bleed off an unnecessary flow rate of hydraulic oil when the discharge pressure of the hydraulic pump detected by the pressure detection portion reaches the operating pressure at which the pressure control device begins to operate. Therefore, when the discharge pressure of the hydraulic pump detected by the pressure detection portion reaches the predetermined range which is set in advance relatively to the operating pressure at which the pressure control device begins to operates, the drive output of the generator motor is decreased and the drive output of the hydraulic pump is limited in order to keep the rotation frequency of the engine within the range of the predetermined values. Accordingly, electric power uselessly consumed by the generator motor can be suppressed more surely.

In addition, in the aforementioned configuration, the construction machine further includes: an operation device which generates and outputs an operation signal addressed to the hydraulic actuator; and a displacement amount detection portion which detects a displacement amount of the hydraulic actuator; wherein: when the operation device outputs the signal to the hydraulic actuator and the displacement amount detected by the displacement amount detection portion is within a predetermined range which is set in advance, the control portion lowers the drive output of the generator motor and limits the drive output of the hydraulic pump in order to keep the rotation frequency of the engine within the range of the predetermined values.

With the configuration made thus, when the operation device outputs the signal to the hydraulic actuator and the displacement amount detected by the displacement amount detection portion (here, the displacement amount has broad meaning including a rotation frequency as a speed or a rotation speed, or a rotation angle as an angular position during displacement or rotation, etc.) is within the predetermined range which is set in advance, electric power is consumed by the generator motor uselessly due to unnecessary assist continued by the generator motor. To solve this problem, in such a case, the drive output of the generator motor is decreased and the drive output of the hydraulic pump is limited in order to keep the rotation frequency of the engine within the range of the predetermined values. Thus, electric power uselessly consumed by the generator motor can be suppressed.

In addition, in the aforementioned configuration, at least one drive portion is provided as the drive portion, and the hydraulic actuator serves as at least a hydraulic cylinder or a hydraulic motor.

With the configuration made thus, the hydraulic actuator driving the drive portion serves as at least a hydraulic cylinder or a hydraulic motor. Accordingly, the control portion lowers the drive output of the generator motor in accordance with the drive state of the hydraulic cylinder or the hydraulic motor, and limits the drive output of the hydraulic pump in order to keep the rotation frequency of the engine within the range of the predetermined values. Accordingly, electric power uselessly consumed by the generator motor can be suppressed in accordance with the drive state of the hydraulic cylinder or the hydraulic motor.

In addition, in the aforementioned configuration, the construction machine further includes: a pressure control device operation state determination portion which determines an operation state of the pressure control device in accordance with a detection result of the displacement amount detection portion or the pressure detection portion; wherein: when the pressure control device operation state determination portion determines that the pressure control device is in operation, the control portion lowers the drive output of the generator motor and limits the drive output of the hydraulic pump in order to keep the rotation frequency of the engine within the range of the predetermined values.

With the configuration made thus, the control portion lowers the drive output of the generator motor and limits the drive output of the hydraulic pump in order to keep the rotation frequency of the engine within the range of the predetermined values when the pressure control device operation state determination portion determines that the pressure control device is in operation in accordance with the detection result of the displacement amount detection portion or the pressure detection portion. Accordingly, electric power uselessly consumed by the generator motor can be suppressed.

In addition, in the aforementioned configuration, the drive portion is configured to be capable of performing a first work and a second work different from the first work; the construction machine further includes a drive portion work state determination portion which determines whether the drive portion is in a state of the first work or a state of the second work; and when the pressure control device operation state determination portion determines that the pressure control device is in operation and the drive portion work state determination portion determines that the drive portion is in the state of the second work, the control portion lowers the drive output of the generator motor and limits the drive output of the hydraulic pump in order to keep the rotation frequency of the engine within the range of the predetermined values.

With the configuration made thus, when the pressure control device operation state determination portion determines that the pressure control device is in operation in accordance with the detection result of the displacement amount detection portion or the pressure detection portion and the drive portion work state determination portion determines that the drive portion is in the state of the second work, an unnecessary flow rate of hydraulic oil is bled off. Therefore, in this case, the drive output of the generator motor is lowered and the drive output of the hydraulic pump is limited in order to keep the rotation frequency of the engine within the range of the predetermined values. Accordingly, electric power uselessly consumed by the generator motor can be suppressed.

In addition, in the aforementioned configuration, when the pressure control device operation state determination portion determines that the pressure control device is not in operation, the control portion drives the hydraulic pump with a drive output of the engine and the drive output of the generator motor; and when the pressure control device operation state determination portion determines that the pressure control device is in operation, the control portion drives the hydraulic pump with the drive output of the generator motor which is lowered in comparison with that when the pressure control device is not in operation.

With the configuration made thus, when the pressure control device operation state determination portion determines that the pressure control device is not in operation, an unnecessary flow rate of hydraulic oil is not bled off. Therefore, the hydraulic pump is driven with the drive output of the engine and the drive output of the generator motor. When the pressure control device operation state determination portion determines that the pressure control device is in operation, an unnecessary flow rate of hydraulic oil is bled off. Therefore, the hydraulic pump is driven with the drive output of the generator motor which is lowered in comparison with that when the pressure control device is not in operation. Accordingly, supply of an unnecessary drive output to the power generator can be suppressed. Thus, electric power uselessly consumed by the generator motor can be suppressed.

Advantageous Effect of Invention

According to the invention, configuration is made in such a manner that the control portion lowers the drive output of the generator motor in accordance with the drive state of the drive portion and limits the drive output of the hydraulic pump in order to keep the rotation frequency of the engine within the range of the predetermined values. With this configuration, when, for example, the discharge pressure of the hydraulic pump increases and the relief valve operates to bleed off an unnecessary flow rate of hydraulic oil, the invention can reduce supply of electric power to the generator motor to thereby decrease the drive output of the generator motor. On this occasion, in accordance with the decrease of the drive output of the generator motor, the drive output of the hydraulic pump becomes overloaded and the rotation frequency of the engine decreases. However, the drive output of the hydraulic pump is decreased in order to keep the rotation frequency of the engine within the range of the predetermined values. Accordingly, the rotation frequency of the engine can be kept within the range of the predetermined values. Thus, electric power uselessly consumed by the generator motor can be suppressed. Problems, configurations and effects other than those which have been described above will be made apparent from description of the following embodiments.

BRIEF DESCRIPTION OF DRAWINGS

FIG. 3 Schematic views showing operation contents in the case where oil pressure of the hydraulic excavator is relieved, in which

FIG. 5 Control block diagrams showing processing of a control unit of the hydraulic excavator, in which

FIG. 7 Charts showing processing for determining an excavation state of the hydraulic excavator, in which FIG. 7(a) shows a determination method of a relief state determination portion and FIG. 7(b) shows a determination method of an excavation state determination portion.

FIG. 8 Charts showing processing for determining a swinging pressing state of a hydraulic excavator according to a second embodiment of the invention, in which FIG. 8(a) shows a determination method of a swinging state determination portion and FIG. 8(b) is a determination method of a swinging pressing determination portion.

DESCRIPTION OF EMBODIMENTS (First Embodiment)

Figure 1:
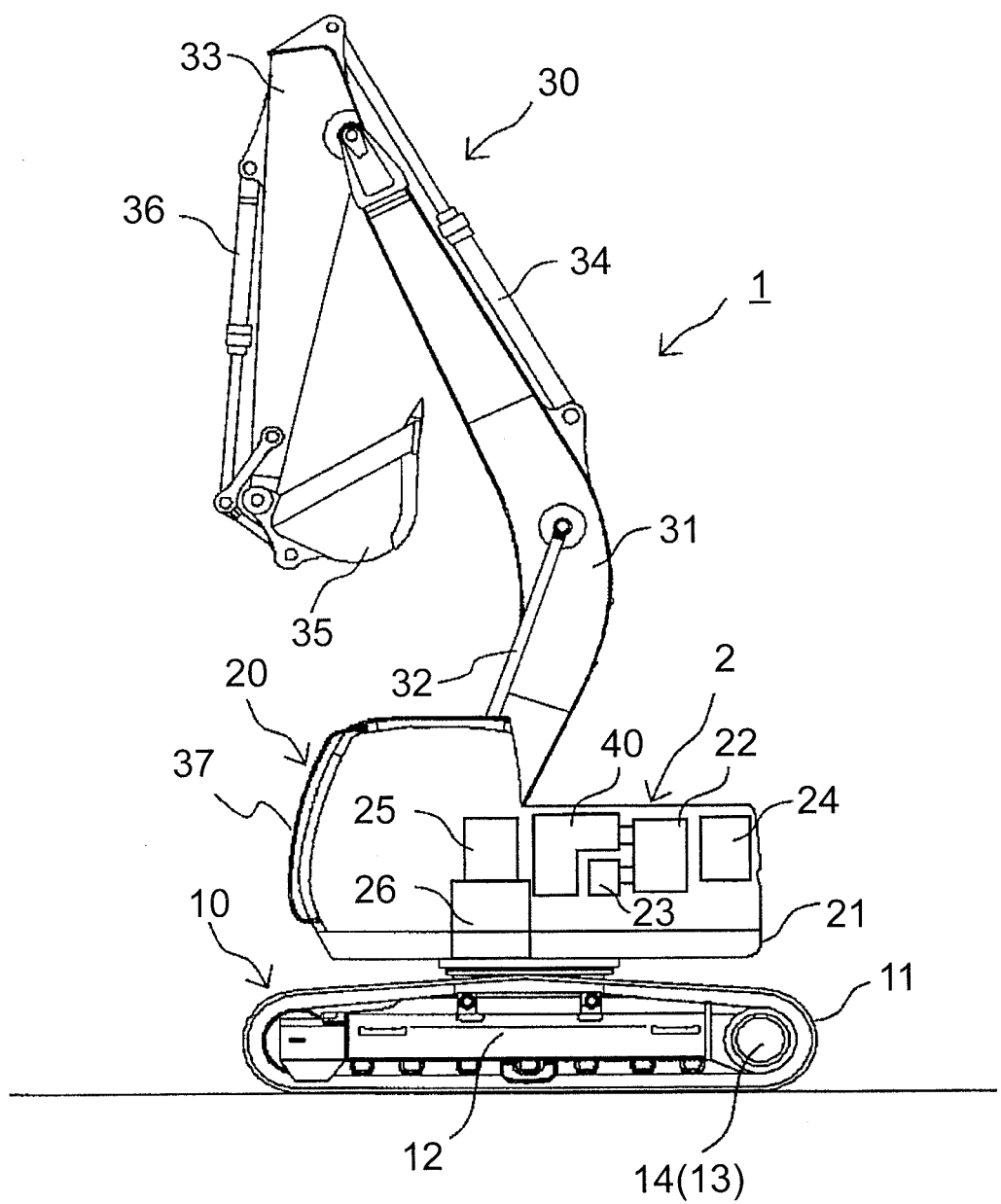
FIG. 1 An external side view of a hydraulic excavator according to a first embodiment of the invention.
Figure 2:
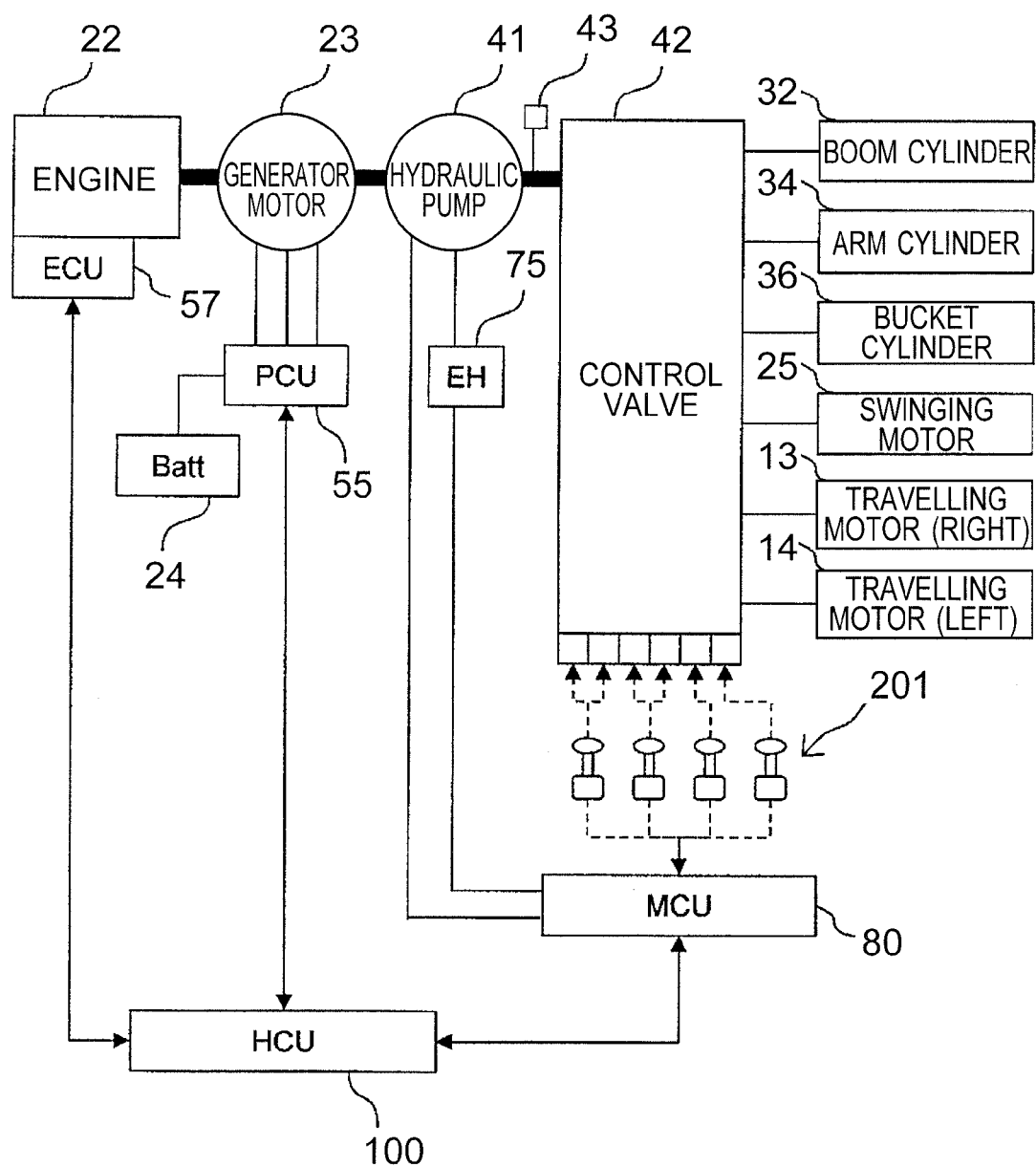
FIG. 2 A system configuration diagram of main electromotive and hydraulic devices of the hydraulic excavator.
Figure 3A:
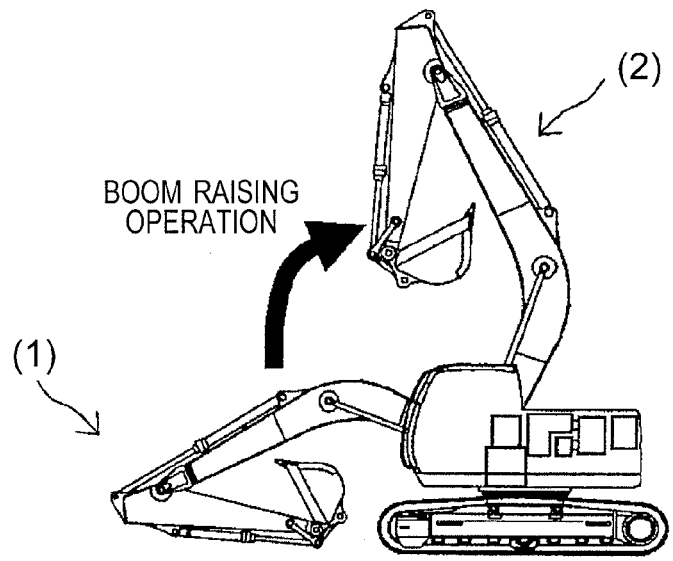
FIG. 3(a) shows a case (1) where a hydraulic excavator has performed a boom lowering operation and a state (2) in which the hydraulic excavator has performed a boom raising operation.
Figure 3B:
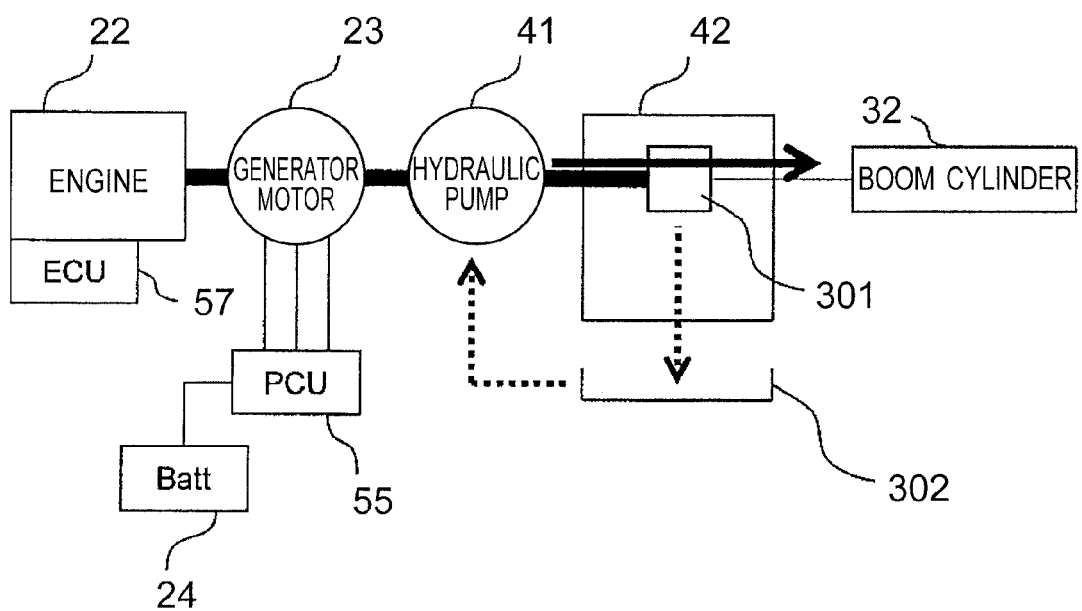
FIG. 3(b) shows a transmission flow of hydraulic power during the boom raising operation of the hydraulic excavator.

A hydraulic excavator according to a first embodiment of a construction machine of the invention will be described below with reference to the drawings. FIG. 1 is an external side view of the hydraulic excavator according to the first embodiment of the invention. FIG. 2 is a system configuration diagram of main electromotive and hydraulic devices of the hydraulic excavator. In addition, FIG. 3 are schematic views showing operation contents in the case where oil pressure of the hydraulic excavator is relieved, in which FIG. 3(a) shows a case (1) where the hydraulic excavator has performed a boom lowering operation and a state (2) in which the hydraulic excavator has performed a boom raising operation, and FIG. 3(b) shows a transmission flow of hydraulic power during the boom raising operation of the hydraulic excavator.

<Overall Configuration>

The hydraulic excavator 1 according to the first embodiment has an excavator body 2 as a body. As shown in FIG. 1, the excavator body 2 includes a lower travelling body 10. The lower travelling body 10 is constituted by a pair of crawlers 11 serving as drive portions which constitute a travelling mechanism, a crawler frame 12 which supports these crawlers 11, travelling motors 13 and 14 and a reduction mechanism (not shown) which control these crawlers 11 to drive independently and respectively, etc. The travelling motors 13 and 14 serve as a pair of travelling hydraulic motors Next, an upper swinging body 20 is attached on the lower travelling body 10 to be capable of swinging in a horizontal direction. The upper swinging body 20 is provided with a swinging frame 21, an engine 22 which is mounted on the swinging frame 21, a generator motor 23 serving as a generator motor which is coupled and attached to the engine 22 and which can be driven as an electric generator or an electric motor, and a swinging motor 25 serving as a swinging hydraulic motor. In addition, the upper swinging body 20 is provided with a battery 24 serving as an electric storage device which is electrically connected to the generator motor 23, a reduction mechanism (not shown) which reduces rotation of the swinging motor 25, and a swinging mechanism 26 serving as a drive portion which drives the upper swinging body 20 to swing with driving power of the swinging motor 25. Here, the battery 24 is configured to store electric power for driving the generator motor 23 and to be charged with electric power regenerated by the generator motor 23.

In addition, a working device 30 serving as a drive portion is mounted on the upper swinging body 20. The working device 30 is constituted by a boom 31, an arm 33 which is pivotally supported rotatably in the vicinity of a distal end portion of the boom 31, a bucket 35 which is pivotally supported rotatably in the vicinity of a distal end portion of the arm 33, etc. Specifically, in the working device 30, the boom 31 is driven by a boom cylinder 32, the arm 33 is driven by an arm cylinder 34, and the bucket 35 is driven by a bucket cylinder 36.

In addition, a cabin 37 serving as a driver's cab is attached to a front side of the upper swinging portion 30. Levers 201 are attached inside the cabin 37. The levers 201 serve as a plurality of operation devices shown in FIG. 2 and are provided for generating and outputting operation signals addressed to respective hydraulic actuators such as the boom cylinder 32, the arm cylinder 34, the bucket cylinder 36, the swinging motor 25, the travelling motors 13 and 14, etc. driving the drive portions in order to operate drive of these hydraulic actuators.

Further, a hydraulic system 40 having a hydraulic pump 41 and a control valve 42 is mounted on the swinging frame 21 of the upper swinging portion 20. Here, the hydraulic pump 41 generates pump power as a drive output for driving the hydraulic actuators such as the boom cylinder 32, the arm cylinder 34, the bucket cylinder 36, the swinging motor 25, and the travelling motors 13 and 14 shown in FIG. 2, etc. and supplies the pump power to these hydraulic actuators. Further, the hydraulic pump 41 is supplied with the driving power from the engine 22 and the generator motor 23. Incidentally, a relief valve 301 serving as a pressure control device operating in accordance with discharge pressure of the hydraulic pump 41 is provided in the control valve 42 of the hydraulic system 40, as shown in FIG. 3(b). Further, a pressure sensor 43 serving as a pressure detection portion for detecting the discharge pressure of the hydraulic pump 41 is attached between the hydraulic pump 41 and the control valve 42, as shown in FIG. 2.

<System Configuration>

As shown in FIG. 2, the engine 22 is connected to the hydraulic pump 41 through the generator motor 23. In the specification of the embodiment, it is assumed that maximum engine power outputted by the engine 22 serving as a motor is smaller than maximum pump power which is required for the hydraulic pump 41 to drive the respective hydraulic actuators, so that the motor can be miniaturized due to the assist of the generator motor in a general hybrid hydraulic excavator. When the pump power of the hydraulic pump 41 exceeds the engine power of the engine 22, the generator motor 23 assists the shortage of the power. In addition, the hydraulic oil from the hydraulic pump 41 is supplied to the control valve 42. The control valve 42 controls the flow rate of the hydraulic oil into the boom cylinder 32, the arm cylinder 34, the bucket cylinder 36, the swinging motor 25, and the travelling motors 13 and 14 and the operation direction in accordance with commands from the levers 201.

Next, the battery 24 is connected to a PCU (Power Control Unit) 55 constituting a part of a control device of the construction machine. Direct-current (DC) power is supplied from the battery 24 to the PCU 55 through a chopper (not shown) inside the PCU 55. The voltage of the DC power is boosted to a predetermined DC voltage and inputted to an inverter (not shown) inside the PCU 55 and drives the generator motor 23.

Further, the PCU 55 is connected to an HCU (Hybrid Control Unit) 100 included in the control portion. An ECU (Engine Control Unit) 57, and an MCU (Machine Control Unit) 80 which is included in the control portion are also connected to the HCU 100. The HCU 100 outputs a command signal to the PCU 55, the ECU 57 or the MCU 80 based on a rotation speed signal, a lever signal, a pressure signal, etc. detected through the PCU 55, the ECU 57 or the MCU 80 to generally control the engine 22, the generator motor 23 and the hydraulic pump 41.

The MCU 80 controls a proportional solenoid valve 75 which is provided in the hydraulic pump 41 and which is provided for controlling a capacity adjustment mechanism (not shown) controlling the pump power. When, for example, a driver operates one of the levers 201 to perform a boom raising operation, the MCU 80 controls the pump power of the hydraulic pump 41 through the proportional solenoid valve 75 to supply the pump power of the hydraulic pump 41 to the boom cylinder 32 through the control valve 42. On this occasion, the HCU 100 estimates pump power required for the hydraulic pump 41 based on a lever signal detected by the MCU 80 and a pressure signal as discharge pressure of the hydraulic pump 41, etc., and estimates the SOC (state of charge) of the battery 24 based on a voltage value of the battery 24 detected by the PCU 55.

Further, the HCU 100 allocates motive power required for the hydraulic pump 41 to the engine 22 and the generator motor 23 appropriately. That is, the HCU 100 has a rotation frequency calculation function of receiving the SOC of the battery 24 from the PCU 55 and calculating a rotation frequency command value based on the SOC, and outputs the calculated rotation frequency command value to the ECU 57. In addition, the HCU 100 has an assist power calculation function of calculating a command value of assist power which should be outputted from the generator motor 23, from a drive state of a drive portion, the SOC of the battery 24, the estimated pump power of the hydraulic pump 41, and the maximum engine power of the engine 22. The relief valve 301 will be described later and the operation state of the relief valve 301 is determined based on the discharge pressure of the hydraulic pump 41. The drive state of the drive portion is determined in accordance with an operation state of the relief valve 301 and an operation amount of the lever 201 or a displacement amount of each hydraulic actuator. The HCU 100 then outputs the calculated assist power command value to the PCU 55. Incidentally, the displacement amount of the hydraulic actuator has wide meaning including the rotation frequency as a speed or a rotation speed, or a rotation angle as an angular displacement during displacement or rotation. The same meaning will be applied hereinafter. In order to prevent an engine stall generated when the estimated pump power of the hydraulic pump 41 required for each hydraulic actuator exceeds the maximum engine power of the engine 22, the MCU 80 has a so-called speed sensing control calculation function of limiting the pump power of the hydraulic pump 41 in accordance with a difference between the rotation frequency command value addressed to the engine 22 and a detected rotation frequency signal so that the rotation frequency of the engine 22 can converge within a range of predetermined values relative to the rotation frequency command value. The MCU 80 then outputs a calculated command signal to the proportional solenoid valve 75.

<Operation of Relief Valve>

First, assume that a driver in the cabin 37 operates one of the levers 201 to perform a boom raising operation from a boom down state (1) in FIG. 3(a). Then, due to the hydraulic oil discharged from the hydraulic pump 41, the boom cylinder 32 makes a stroke to perform the boom raising operation as indicated by a solid-line arrow in FIG. 3(b).

On the other hand, when the driver in the cabin 37 operates the lever 201 from a boom up state (2) in FIG. 3(a) to further issue an instruction of a boom raising operation, the boom cylinder 32 makes a full stroke to reach a stroke end from which the boom cylinder 32 cannot extend any more with the result that the boom raising operation is restricted. Therefore, the boom cylinder 32 is supplied with the hydraulic oil from the hydraulic pump 41 in spite of no change in the cylinder speed or displacement as a displacement amount. Accordingly, the discharge pressure of the hydraulic oil from the hydraulic pump 41 increases and then reaches set pressure of the relief valve 301. When the discharge pressure of the hydraulic oil of the hydraulic pump 41 reaches the predetermined relief pressure, the relief valve 301 operates to bleed off the hydraulic oil into a tank 302 as indicated by a dotted line arrow in FIG. 3(*b*). Incidentally, when the hydraulic excavator touches an obstacle such as a groove wall existing in an operation direction in the case of a swinging operation or a travelling operation, the operation is restricted and the relief valve 301 operates to bleed off the hydraulic oil in the same manner as in the case of the cylinder.

To this end, a relief mechanism is used so that the relief valve 301 can operate when the discharge pressure of the hydraulic pump 41 increases and reaches the predetermined relief pressure as a result of restriction of operation of the cylinder such as the boom cylinder 32 or operation of the hydraulic motor such as the swinging motor 25.

<Operation>

Figure 4:
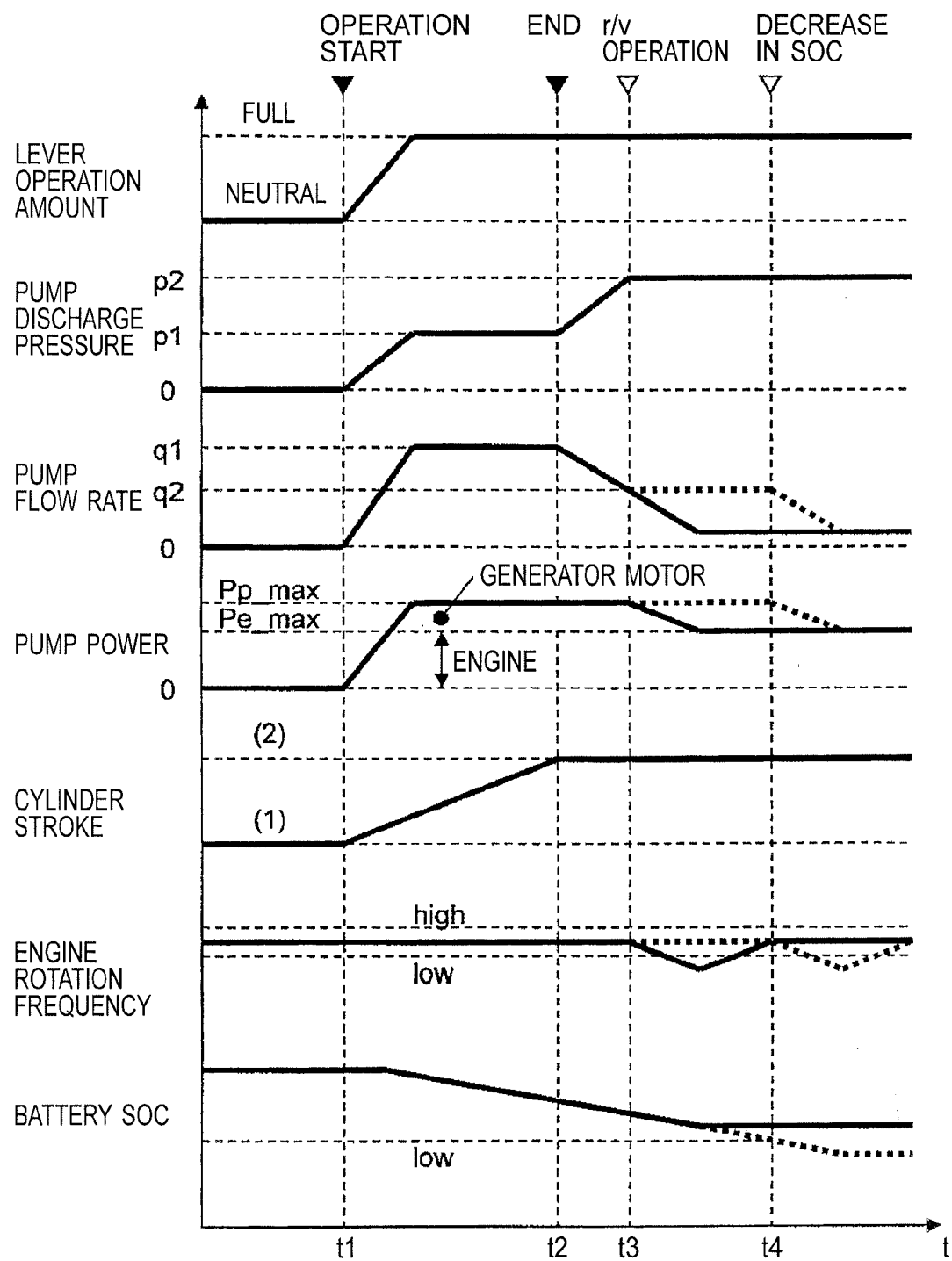
FIG. 4 A time chart showing the boom raising operation of the hydraulic excavator.

Next, operation of the construction machine according to the invention will be described with reference to FIG. 4. FIG. 4 is a time chart showing the boom raising operation of the hydraulic excavator.

Here, the abscissa in FIG. 4 designates time (t), and the ordinate in FIG. 4 designates an operation amount of a lever 201, discharge pressure of the hydraulic pump 41 detected by the pressure sensor 43, a flow rate of the hydraulic pump 41, motive power of the hydraulic pump 41, a stroke of the boom cylinder 32, a rotation frequency of the engine 22, and the SOC of the battery 24 in descending order from the top. In addition, the solid line in FIG. 4 expresses an operation in the case where the invention is applied, and the dotted line in FIG. 4 expresses an operation in the case where the aforementioned background-art technique described in Patent Literature 1 is applied.

[Background-Art Technique]

First, the operation in the case where the background-art technique described in Patent Literature 1 is applied will be described.

When the driver fully operates the lever 201 from a neutral state to issue an instruction of a boom raising operation at a time instant t1, the discharge pressure of the hydraulic pump 41 increases up to p1, the flow rate of the hydraulic pump 41 increases up to q1 and the pump power of the hydraulic pump 41 increases up to maximum pump power Pp_max. On this occasion, the boom cylinder 32 can move up to the state (2) (the boom up state) in FIG. 3(*a*) from the state (1) (the boom down state) in FIG. 3(*a*) by the pump power of the hydraulic pump 41. When the pump power of the hydraulic pump 41 exceeds maximum engine power Pe_max of the engine 22, the generator motor 23 is supplied and driven with electric power from the battery 24 by the assist power calculation function so that the shortage of the power can be supplemented with the assist power. Since the battery 24 supplies the electric power to the generator motor 23, the SOC of the battery 24 decreases gradually.

The boom cylinder 32 then makes a full stroke to reach a stroke end at a time instant t2. As a result, the boom raising operation is restricted. Then, the boom cylinder 32 cannot move anymore in the state (2) (the boom up state) in FIG. 3(*a*). Further, when the driver operates the lever 201 to continue the instruction of the boom raising operation for a warming-up operation etc., the discharge flow rate of the hydraulic pump 41 decreases to q2 from q1 as the discharge pressure of the hydraulic pump 41 increases from p1 based on constant horse power control which is a known technique. Here, the same control as in the case where the boom raising operation is restricted with the result that the boom cylinder 32 cannot move anymore is performed in the case where a very hard place is excavated with the result that the boom 31 is driven at a very slow speed.

Further, when the discharge pressure of the hydraulic pump 41 reaches p2 as the predetermined relief pressure at a time instant t3, the relief valve 301 operates to keep the discharge pressure of the hydraulic pump 41 at p2 and keep the pump power at the maximum pump power Pp_max by the maximum engine power Pe_max of the engine 22 and the assist power of the generator motor 23 as indicated as the pump power designated by the dotted line in FIG. 4 at and after the time instant t3. On this occasion, the hydraulic oil from the hydraulic pump 41 is uselessly bled off into the tank 302 through the relief valve 301 while the pump flow rate is kept at q2 as indicated as the pump flow rate designated by the dotted line in FIG. 4.

The electric power of the battery 24 is then consumed by the assist power of the generator motor 23 so as to decrease the SOC of the battery 24. At a time instant t4, control based on the assist power calculation function is made to limit the assist power of the generator motor 23. Then, the pump power of the hydraulic pump 41 is overloaded beyond the maximum engine power Pe_max of the engine 22. As a result, the rotation frequency of the engine 22 begins to decrease, but control based on the speed sensing control calculation function is made to limit the pump power of the hydraulic pump 41 in accordance with the decrease of the rotation frequency of the engine 22. Due to the control, the flow rate of the hydraulic pump 41 further decreases so that the rotation frequency of the engine 22 can converge within a range of predetermined values (within a range between broken lines designated as high and low in terms of the engine rotation frequency in FIG. 4).

Consequently, when the background-art technique described in Patent Literature 1 is applied, the power assist of the generator motor 23 is continued up to the time instant t4 at which the SOC of the battery 24 decreases, after the boom raising operation is completed at the time instant t2. Accordingly, the electric power of the battery 24 is consumed uselessly.

[The Invention]

Next, the operation in the case where the construction machine according to the invention is applied will be described.

First, the same operation as that in the case of the aforementioned background-art technique described in Patent Literature 1 is performed up to the time instant t2. At the time instant t3, the discharge pressure of the hydraulic pump 41 detected by the pressure sensor 43 reaches p2 as the predetermined relief pressure. In addition, when the relief valve 301 operates, control based on the assist power calculation function of the HCU 100 in accordance with the drive state of the drive portion etc. is made to limit the assist power of the generator motor 23, as indicated by the solid line in FIG. 4. On this occasion, the pump power of the hydraulic pump 41 is overloaded beyond the maximum engine power Pe_max of the engine 22. Therefore, although the rotation frequency of the engine 22 begins to decrease, control based on the speed sensing control calculation function of the HCU 100 is made to limit the pump power of the hydraulic pump 41 in accordance with the decrease of the rotation frequency of the engine 22. The flow rate of the hydraulic pump 41 further decreases and control is made so that the rotation frequency of the engine 22 can converge within a range of predetermined values.

As described above, when the construction machine according to the invention is applied, control is started to limit the assist power of the generator motor 23 immediate after the boom cylinder 32 makes a full stroke at the time instant t2, i.e. since the time instant t3 at which the relief valve 301 operates.

Accordingly, power consumption of the battery 24 can be reduced in comparison with the case of the aforementioned background-art technique described in Patent Literature 1.

<Processing of Control Unit>

Figure 5A:
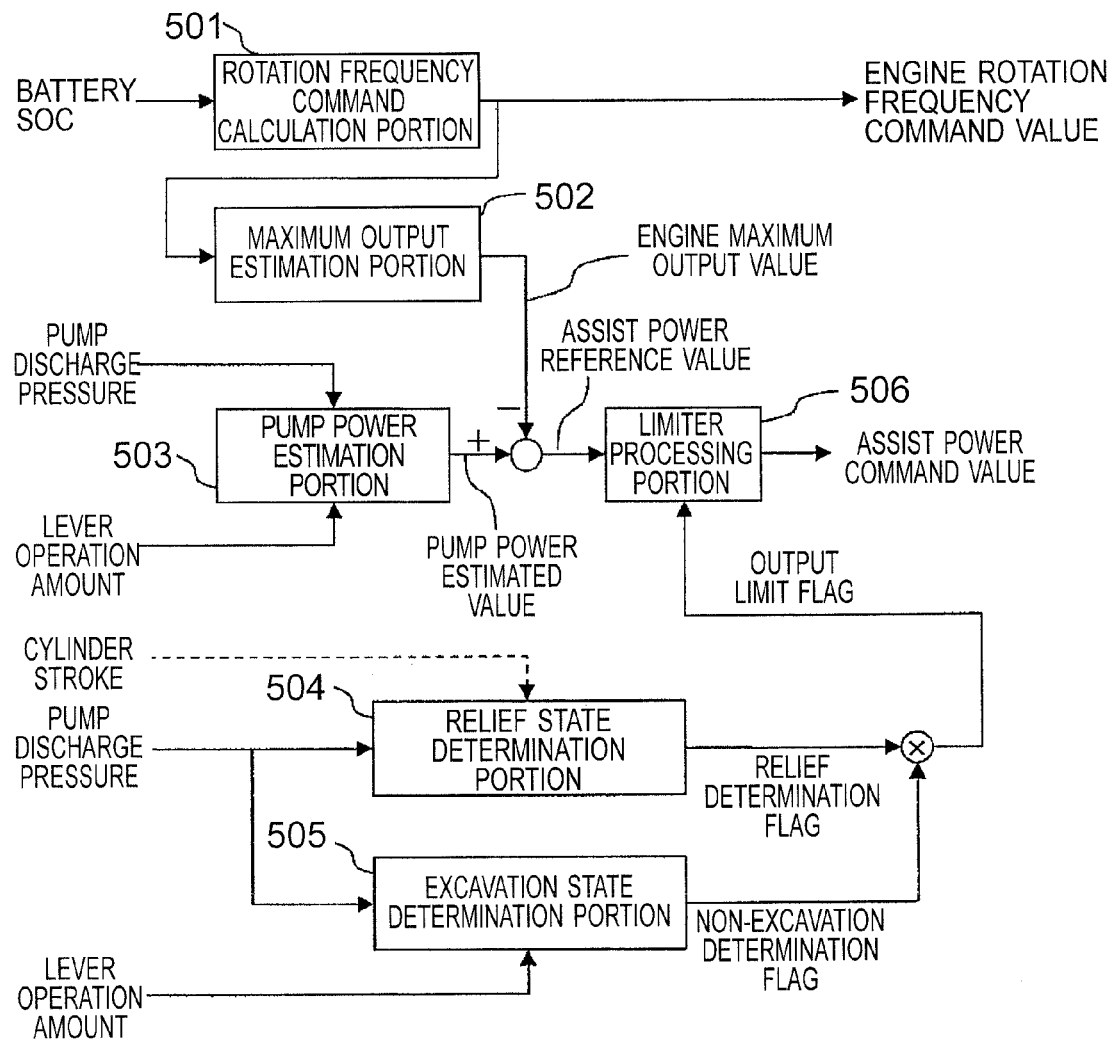
FIG. 5(a) shows processing of an HCU and FIG. 5(b) shows processing of an MCU.
Figure 5B:
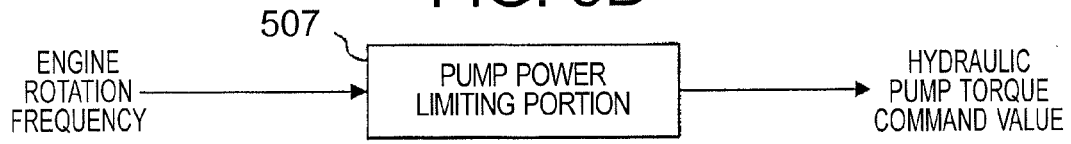

Next, processing of the HCU 100 and the MCU 80 of the control device of the construction machine according to the invention will be described with reference to FIG. 5. FIG. 5 are control block diagrams showing processing of the control unit (control device) of the hydraulic excavator, in which FIG. 5(a) shows processing of the HCU and FIG. 5(b) shows processing of the MCU.

[HCU]

The following processing is programmed in the HCU 100 and repeatedly executed in a predetermined period which is set in advance.

In addition, in the following description, outputs of the generator motor 23 on a motoring side and a regeneration side (power generation side) are defined as positive value and negative value respectively. In addition, outputs of the battery 24 on a discharging side and a charging side are defined as positive value and negative value respectively.

A rotation frequency command calculation portion 501 shown in FIG. 5(a) calculates a rotation frequency command value of the engine 22 in accordance with the SOC of the battery 24 detected by the PCU 55. That is, the rotation frequency command calculation portion 501 has the aforementioned rotation frequency command calculation function. Specifically, when, for example, the SOC of the battery 24 is high, the rotation frequency command calculation portion 501 reduces the rotation frequency of the engine 22 to reduce the output of the engine 22 in order to increase an amount of power assist performed by the generator motor 23 because the SOC is sufficient. On the other hand, when the SOC of the battery 24 is low, the rotation frequency command calculation portion 501 makes control, for example, to increase the rotation frequency of the engine 22 in order to decrease the power assist amount of the generator motor 23 while suppressing consumption of the SOC of the battery 24 in order to prevent the SOC of the battery 24 from being smaller than a rechargeable minimum SOC value, so that the output of the engine 22 alone can be enough for the power motive of the hydraulic pump 41 if possible.

Next, a maximum output estimation portion 502 is connected to the rotation frequency command calculation portion 501. The maximum output estimation portion 502 estimates maximum engine power as a maximum output of the engine 22 in accordance with the rotation frequency command value of the engine 22 calculated by the rotation frequency command calculation portion 501. Incidentally, the estimation of the maximum engine power is not limited to the case where the rotation frequency command value of the engine 22 is used, but the maximum engine power may be estimated by use of the rotation frequency of the engine 22 detected by the ECU 57.

Further, a pump power estimation portion 503 estimates pump power of the hydraulic pump 41 in accordance with discharge pressure of the hydraulic pump 41 detected by the MCU 80 and operation amounts of the levers 201. Specifically, the pump power estimation portion 503 estimates operation speeds of the hydraulic actuators from the operation amounts of the levers 201 to thereby obtain an estimated discharge flow rate of the hydraulic pump 41. The pump power estimation portion 503 estimates pump power of the hydraulic pump 41 from the discharge pressure of the hydraulic pump 41 and the estimated discharge flow rate of the hydraulic pump 41.

In addition, a relief state determination portion 504 serves as a pressure control device operation state determination portion. The relief state determination portion 504 determines an operation state of the aforementioned relief valve 301 based on the discharge pressure of the hydraulic pump 41 detected by the MCU 80 through the pressure sensor 43 to thereby calculate a relief determination flag. Incidentally, processing of the relief state determination portion 504 will be described later.

Next, an excavation state determination portion 505 serves as a drive portion work state determination portion. The excavation state determination portion 505 determines whether the working device 30 is in a state of an excavation work as a state of a first work or in a state of a non-excavation work as a state of a second work. The state of the first work and the state of the second work are included in the drive state of the drive portion. Specifically, the excavation state determination portion 505 determines a state of an excavation work or a state of a non-excavation work of the working device 30 in accordance with the discharge pressure of the hydraulic pump 41 detected by the MCU 80 and the operation amounts of the levers 201 to calculate a non-excavation determination flag. Incidentally, processing of the excavation state determination portion 505 will be described later.

Further, a limiter processing portion 506 limits an assist power reference value of the generator motor 23 which is obtained from a difference between the pump power estimated value calculated by the pump power estimation portion 503 and the maximum engine power of the engine 22 estimated by the maximum output estimation portion 502. That is, the limiter processing portion 506 has the aforementioned assist power calculation function. When, for example, determination is made that the relief valve 301 is in operation and determination is made that the working device 30 is in the non-excavation state respectively based on the relief determination flag calculated by the relief state determination portion 504 and the non-excavation determination flag calculated by the excavation state determination portion 505, the limiter processing portion 506 applies predetermined limit processing to the assist power reference value of the generator motor 23 to calculate an assist power command value of the generator motor 23. Specifically, the limiter processing portion 506 drives the hydraulic pump 41 by the engine 22 and the assist power of the generator motor 23 before the relief valve 301 operates, that is, when the relief state determination portion 504 determines that the relief valve 301 is not in operation, as shown in FIG. 4. Further, after the relief valve 301 operates, that is, when the relief state determination portion 504 determines that the relief valve 301 is in operation, the limiter processing portion 506 lowers the assist power of the generator motor 23 in comparison with that when the relief valve 301 is not in operation, and controls the pump power of the hydraulic pump 41.

Incidentally, the limiter processing portion 506 maybe configured to change limit contents in accordance with the oil temperature of the hydraulic oil of each hydraulic actuator such as the boom cylinder 32 detected by the MCU 80 etc. For example, when the oil temperature of the hydraulic oil is low, the viscosity of the hydraulic oil discharged from the hydraulic pump 41 is comparatively high so that control contents may be changed to allow the generator motor 23 to aggressively perform power assist in order to accelerate an operation of warming up the hydraulic oil.

[MCU]

The following processing is programmed in the MCU 80 and repeatedly executed in a predetermined period which is set in advance.

As shown in FIG. 5(b), a pump power limiting portion 507 calculates a torque command value for the hydraulic pump 41 in order to limit the pump power of the hydraulic pump 41 in accordance with the rotation frequency of the engine 22 detected by the ECU 57. That is, the pump power limiting portion 507 has the aforementioned speed sensing control calculation function. Specifically, when the pump power of the hydraulic pump 41 is overloaded beyond the maximum engine power of the engine 22 due to the limited assist power of the generator motor 23 as shown in FIG. 4, the rotation frequency of the engine 22 decreases. Therefore, the pump power limiting portion 507 makes control to reduce the torque of the hydraulic pump 41 and limit the pump power of the hydraulic pump 41 in order to prevent engine stall.

The speed sensing control is made to control the capacity adjustment mechanism (not shown) of the hydraulic pump 41 so as to prevent absorption torque of the hydraulic pump 41 from exceeding set maximum absorption torque. That is, the speed sensing control is made as follows. That is, a first reduced torque amount $\Delta T$ is calculated based on a deviation between the rotation frequency command value of the engine 22 and a rotation frequency signal which is an actual rotation frequency of the engine 22. An output command corresponding to the first reduced torque amount $\Delta T$ is outputted to the proportional solenoid valve 75 from the MCU 80. The proportional solenoid valve 75 inputs a control signal generated in accordance with the output command to the capacity adjustment mechanism, and changes the maximum absorption torque of the hydraulic pump 41 mechanically set for the capacity adjustment mechanism, in accordance with the control signal. In other words, the speed sensing control is made in such a manner that when the rotation frequency signal is lower than the rotation frequency command value of the engine 22, that is, when the pump power of the hydraulic pump 41 is larger than the maximum engine power of the engine 22, the maximum absorption torque of the hydraulic pump 41 is reduced temporarily so that the rotation frequency of the engine 22 can converge within the range of the predetermined values rapidly without causing engine install.

<Excavation Work>

Figure 6:
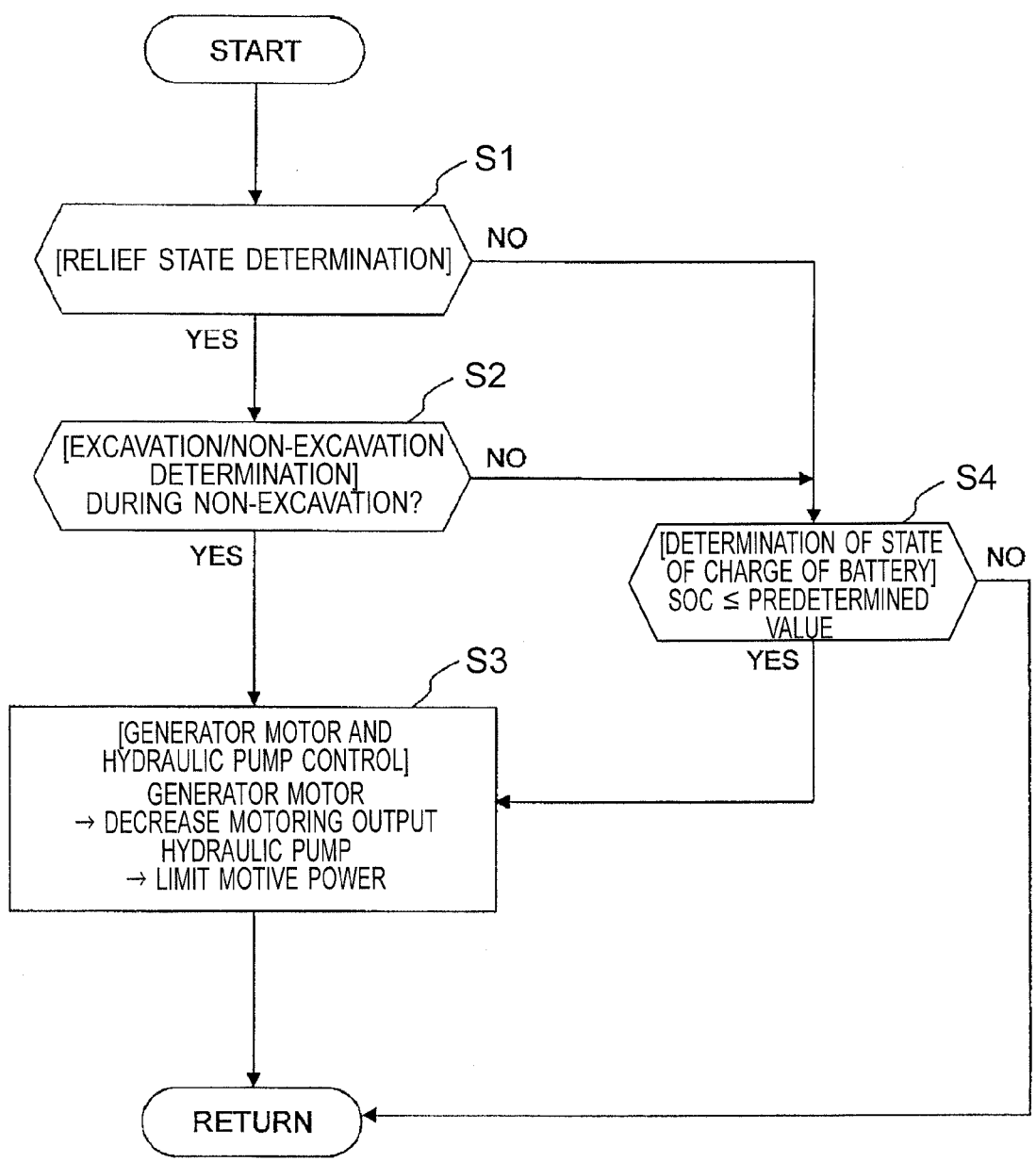
FIG. 6 A flow chart showing processing of the hydraulic excavator.

Next, processing of the relief state determination portion 504 and the excavation state determination portion 505 of the construction machine according to the invention will be described with reference to FIG. 6 and FIG. 7. FIG. 6 is a flow chart showing processing of the hydraulic excavator. FIG. 7 are charts showing processing for determining an excavation state of the hydraulic excavator, in which FIG. 7(a) shows a determination method of the relief state determination portion 504 and FIG. 7(b) shows a determination method of the excavation state determination portion 505.

<Determination of Relief State>

Condition No. 1 in FIG. 7(a) shows the case where the relief determination flag is OFF, i.e. the state is determined as a non-relief state, in previous determination. When a state in which the discharge pressure (pump discharge pressure) of the hydraulic pump 41 is not smaller than a value obtained by subtracting a predetermined value $\alpha$ from operating pressure (relief pressure) of the relief valve 301, i.e. pump discharge pressure≥relief pressure-$\alpha$, is kept for a predetermined time in the Condition No. 1, the relief determination flag is turned ON, i.e. the state is determined as a relief state. Otherwise, the determination of the non-relief state is continued. Incidentally, the predetermined time for determining the progress of the state indicating pump discharge pressure≥relief pressure-$\alpha$ is a determination time which is set in consideration of stable determination of both the pump discharge pressure and the relief pressure and improvement of the determination accuracy of the relief state and the non-relief state performed by the relief state determination portion 504.

Next, Condition No. 2 in FIG. 7(a) shows the case where the relief determination flag is ON in previous determination. When a state in which a value obtained by subtracting the pump discharge pressure from the relief pressure is not smaller than a predetermined value $\beta$, i.e. relief pressure-pump discharge pressure≥$\beta$, is kept for a predetermined time in the Condition No. 2, determination is made to turn the relief determination flag OFF. Otherwise, the determination of the relief state is continued. Incidentally, the predetermined time for determining the progress of the state in which the value is not smaller than the predetermined value$\beta$ is a determination time which is set in consideration of stable determination of the pump discharge pressure and the relief pressure and improvement of the determination accuracy performed by the relief state determination portion 504.

As described above, the relief state determination portion 504 can determine to change the state from the non-relief state to the relief state or to change the state from the relief state to the non-relief state by use of the pump discharge pressure. Incidentally, the predetermined value $\alpha$ and the predetermined value $\beta$ are set respectively at values which are slightly lower than the relief pressure. However, the predetermined value $\alpha$ and the predetermined value $\beta$ may be equal to each other or different from each other. In the case of a work requiring power, the pump discharge pressure is desired to be used up to pressure close to the relief pressure. Accordingly, the relation that the predetermined value $\alpha$ is smaller than the predetermined value $\beta$, i.e. $\beta > \alpha$ is desirable.

[Determination of Excavation State]

Condition No. 1 in FIG. 7(b) shows the case in which the non-excavation determination flag is ON, i.e. the state is determined as a non-excavation state, in previous determination. When the discharge pressure of hydraulic pump 41 is not smaller than a predetermined value, a crowding (arm crowding) operation amount of the arm 33 caused by an operation of one of the levers 201 is not smaller than a predetermined value, and a raising operation amount of the boom 31 or a crowding (bucket crowding) operation amount of the bucket 35 is not smaller than a predetermined value in the Condition No. 1, the non-excavation determination flag is turned OFF, i.e. the state is determined as an excavation state. Otherwise, the determination of the non-excavation state is continued.

Further, Condition No. 2 in FIG. 7(b) shows the case where the non-excavation determination flag is OFF in previous determination. When the discharge pressure of the hydraulic pump 41 is not smaller than a predetermined value and the crowding (arm crowding) operation amount of the arm 33 is not smaller than a predetermined value in the Condition No. 2, the determination that the non-excavation determination flag is OFF is continued. Otherwise, the non-excavation determination is turned ON, i.e. the state is determined as a non-excavation state.

As described above, the excavation state determination portion 505 can determine the excavation state or the non-excavation state in a time sequence based on the pump discharge pressure and the operation amounts of the levers 201. Incidentally, the pump discharge pressure and the hydraulic actuators operated through the levers 201 as shown in FIG. 7(b) are exemplified for determining the excavation state. The invention is not limited thereto. For example, in the case of a scrap work etc., determination may be made by use of operation amounts of levers 201 through which hydraulic cylinders driving a fork grapple are operated.

<Effects and Functions>

As described above, the HCU 100 is provided with the relief state determination portion 504 which determines an operation state of the relief valve 301 and the excavation state determination portion 505 which determines an excavation state or a non-excavation state. Consequently, the relief state determination portion 504 first determines whether the discharge pressure of the hydraulic pump 41 is in a relief state or not (S1) as shown in FIG. 6. When determination is made that the discharge pressure of the hydraulic pump 41 is in a relief state (if Yes) in the step S1, the excavation state determination portion 505 determines whether the operation state of the working device 30 is an excavation state or a non-excavation state (S2). When determination is made that the operation state of the working device 30 is a non-excavation state (if Yes) in the step S2, the generator motor 23 and the hydraulic pump 41 are controlled to lower the assist power of the generator motor 23 and limit the pump power of the hydraulic pump 41 so as to keep the rotation frequency of the engine 22 within a range of predetermined values (S3).

On the other hand, when determination is made that the discharge pressure of the hydraulic pump 41 is not in a relief state (if No) in the step S1 or when determination is made that the operation state of the working device 30 is an excavation state (if No) in the step S2, the state of charge of the battery 24 is determined so that it can be determined whether the SOC of the battery 24 is larger than a predetermined value or not, i.e. SOC≤predetermined value (S4). Here, the predetermined value is determined depending on battery characteristics etc. of the battery 24. For example, the predetermined value can be set as a minimum SCO value etc. at which the battery 24 can be recharged. When determination is made that the SOC is not larger than the predetermined value (if Yes) in the step S4, the processing flow goes to the step S3 in which the supply of electric power from the battery 24 is reduced. Then, the processing flow returns to the step S1.

On the contrary, when determination is made that the SOC is larger than the predetermined value (if No) in the step S4, the processing flow returns to the step S1 without lowering the assist power of the generator motor 23 and limiting the pump power of the hydraulic pump 41. The steps S1 to S3 or the steps S1 to S4 are repeated every predetermined period which has been described above.

Incidentally, when the aforementioned background-art technique described in Patent Literature 1 is applied, processing from the step S1 to the step S3 is not performed but only determination of the SOC (determination of the state of charge) of the battery 24 described in the step S4 is performed. Accordingly, in the case where, for example, hard bedrock etc. is excavated, the relief valve 301 operates frequently to thereby lead to the lowering of the working efficiency when the assist power of the generator motor 23 is limited excessively. Accordingly, it is preferable that the operation state of the relief valve 301 is determined, the excavation state or the non-excavation state of the working device 30 is determined and the assist power of the generator motor 23 is limited in accordance with these determination results, as shown in FIG. 5 to FIG. 7.

(Second Embodiment)

FIG. 8 are charts showing processing for determining a swinging pressing state of a hydraulic excavator according to a second embodiment of the invention, in which FIG. 8(*a*) shows a determination method of a swinging state determination portion provided in the HCU 100 and FIG. 8(*b*) shows a determination method of a swinging pressing determination portion provided in the HCU 100. The second embodiment is different from the aforementioned first embodiment as follows. That is, the assist power of the generator motor 23 and the pump power of the hydraulic pump 41 are controlled based on the relief state of the relief valve 301 and the excavation state in the first embodiment. On the other hand, the assist power of the generator motor 23 and the pump power of the hydraulic pump 41 are controlled based on a swinging state and a swinging pressing state of the upper swinging body 20 in the second embodiment. Incidentally, identical or corresponding components to those in the first embodiment are referred to by the same numerals correspondingly and respectively in the second embodiment.

Specifically, the second embodiment is applied to processing for the case of a so-called swinging pressing work (swinging side pressing work), in which the upper swinging body 20 of the hydraulic excavator 1 is operated to swing to press the bucket 35 of the working device 30 against a groove wall in order to harden soil in the groove wall to prevent the soil from falling during groove excavation. The swinging state determination portion (not shown) serving as a pressure control device operation state determination portion detects a rotation frequency, which is a displacement amount of the swinging motor 25 of the hydraulic excavator 1, by means of a rotation speed sensor (not shown) in accordance with a swinging operation amount of the swinging motor 25 based on an operation amount of one of the levers 201 and determines the swinging state of the upper swinging body 20 in accordance with the rotation frequency of the swinging motor 25. That is, when the rotation frequency of the swinging motor 25 does not reach a rotation frequency corresponding to the operation amount of the lever 201, the bucket 35 of the working device 30 is pressing against the groove wall and the swinging operation stops while the hydraulic oil from the hydraulic pump 41 is still discharged continuously with the result that the discharge pressure increases and the relief valve 301 operates. Therefore, the operation of the relief valve 301 can be determined based on the displacement amount. In addition, the swinging pressing state determination portion (not shown) serving as a drive portion work state determination portion determines whether the state of the work is a state of a swinging pressing work as a state of a first work or a state of a non-swinging pressing work as a state of a second work in accordance with the discharge pressure of the hydraulic pump 41 detected by the pressure sensor 43 and the swinging operation amount of the swinging motor 25 based on the operation amount of the lever 201.

[Determination of Swinging State]

First, Condition No. 1 in FIG. 8(*a*) shows the case in which a swinging stop determination flag is OFF, i.e. the state is determined as swinging (swinging state), in previous determination. When a state in which the rotation frequency scalar of the swinging motor 25 is not larger than a predetermined value δ, i.e. |rotation frequency of swinging motor|≤δ, is kept for a predetermined time in the Condition No. 1, the swinging stop determination flag is turned ON, i.e. the state is determined as a swinging stop state (non-swinging state). Otherwise, the determination of the swinging state is continued. Incidentally, the expression |rotation frequency of swinging motor| is made on the assumption that leftward and rightward rotation frequencies of the swinging motor 25 are expressed as positive and negative respectively. The same rule can be also applied to Condition No. 2 of FIG. 8(*a*) which will be described later.

Next, the Condition No. 2 of FIG. 8(*a*) shows the case where the swinging stop determination flag is ON, i.e. the state is determined as a swinging stop state, in previous determination. When a state in which the rotation frequency scalar of the swinging motor 25 is not smaller than a predetermined value γ, i.e. |rotation frequency of swinging motor|≥γ is kept for a predetermined time in the Condition No. 2, the swinging stop determination flag is turned OFF, i.e. the state is determined as a swinging state. Otherwise, the determination of the swinging stop state is continued.

As described above, the swinging state determination portion measures a rotation frequency of the swinging motor 25 and determines a swinging state of the upper swinging body 20 based on the rotation frequency of the swinging motor 25. In addition, in the same manner as in the first embodiment, a predetermined time is provided so that occurrence of hunting of the upper swinging body 20 caused by repeated ON and OFF of the swinging stop determination flag and misjudgment for determining the swinging state can be prevented.

[Determination of Swinging Pressing State]

Condition No. 1 in FIG. 8(b) shows the case where the non-swinging pressing determination flag is ON, i.e. the state is determined as a non-swinging pressing state, in previous determination. When the discharge pressure (pump discharge pressure) of the hydraulic pump 41 detected by the pressure sensor 43 is not smaller than a predetermined value and the operation amount (swinging operation amount) of the lever 201 for operating the upper swinging body 20 to swing is not smaller than a predetermined value in the Condition No. 1, the non-swinging pressing determination flag is turned OFF, i.e. the state is determined as a swinging pressing state. Otherwise, the determination of the non-swinging pressing state is continued.

Further, Condition No. 2 in FIG. 8(b) shows the case where the non-swinging pressing determination flag is OFF, i.e. the state is determined as a swinging pressing state, in previous determination. When the pump discharge pressure detected by the pressure sensor 43 is not smaller than a predetermined value and the swinging operation amount is not smaller than a predetermined value in the Condition No. 2, the non-swinging pressing determination flag is OFF, i.e. the determination of the swinging pressing state is continued. Otherwise, the non-swinging pressing determination flag is turned ON, i.e. the state is determined to be not a swinging pressing state (non-swinging pressing state).

As described above, when the swinging pressing state determination portion determines that the upper swinging body 20 is in a non-swinging state and in a state of a swinging pressing work, the assist power of the generator motor 23 is lowered and the motive power of the hydraulic pump 41 is limited in order to keep the rotation frequency of the engine 22 within the range of the predetermined values. The swinging pressing work represented by hardening the groove wall requires swinging power but does not require a high swinging speed, i.e. a high rotation frequency. From this fact, the pump power of the hydraulic pump 41 may be obtained from the engine power of the engine 22 without use of the assist power of the generator motor 23. Thus, the second embodiment is effective in suppressing the supply of electric power to the generator motor 23 from the battery 24.

(Third Embodiment)

Figure 9:
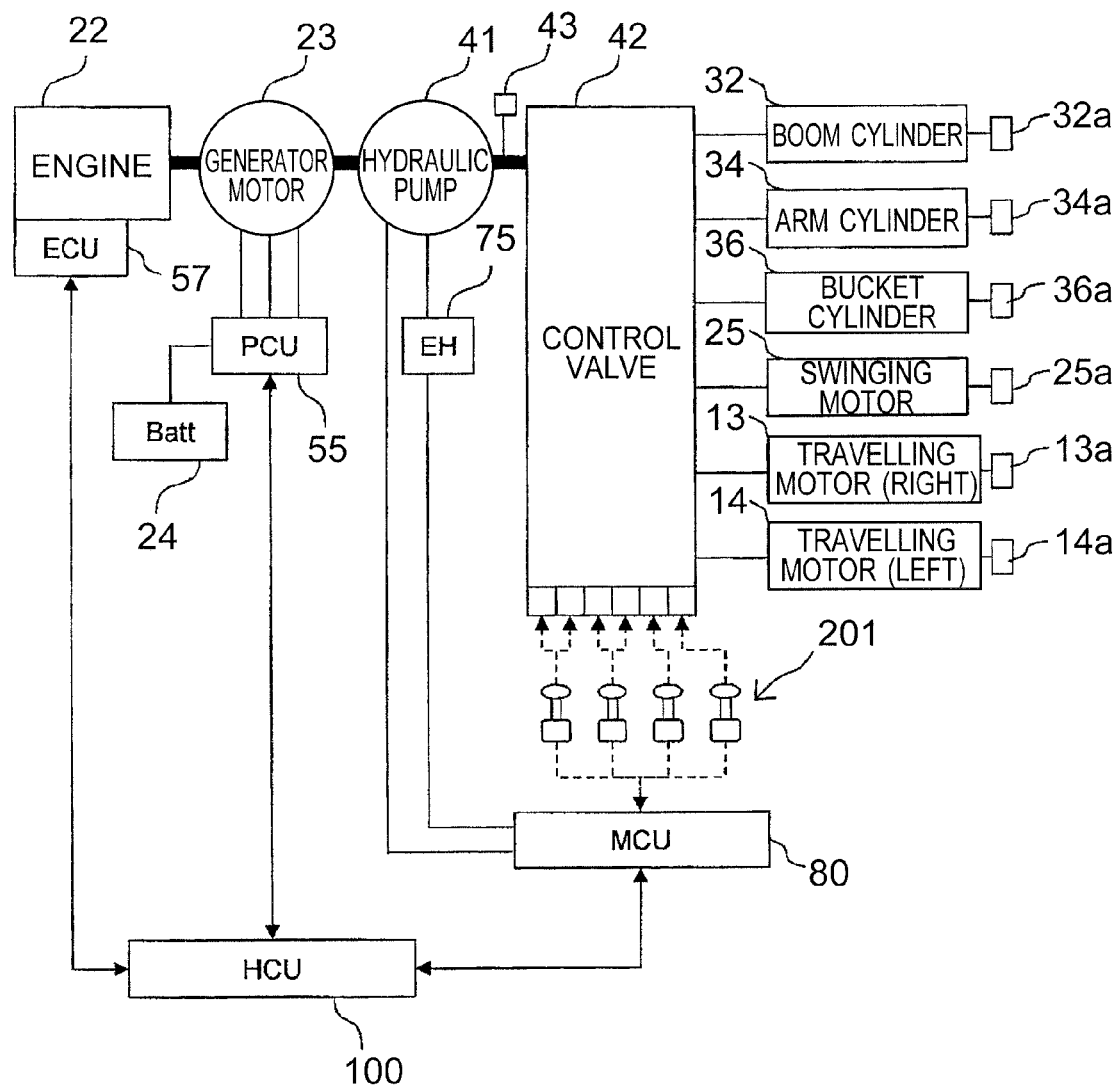
FIG. 9 A system configuration diagram of main electromotive and hydraulic devices of a hydraulic excavator according to a third embodiment of the invention.

FIG. 9 is a system configuration diagram of main electromotive and hydraulic devices of a hydraulic excavator according to a third embodiment of the invention. The third embodiment is different from the aforementioned first embodiment as follows. That is, the assist power of the generator motor 23 is limited in accordance with the pump discharge pressure detected by the pressure sensor 43 and the operation amounts of the levers 201 in the first embodiment. On the other hand, assist power of the generator motor 23 is limited in accordance with pump discharge pressure detected by the pressure sensor 43 and displacements of the hydraulic actuators which are detected by displacement sensors 13a, 14a, 25a, 32a, 34a, and 36a serving as the displacement amount detection portions and which correspond to operation amounts of the levers 201. Incidentally, identical or corresponding components to those in the first embodiment are referred to by the same numerals correspondingly and respectively in the third embodiment.

Specifically, the displacement sensors 13a, 14a, 25a, 32a, 34a and 36a are attached to the hydraulic cylinders and the hydraulic motors, i.e. the travelling motors 13 and 14, the swinging motor 25, the boom cylinder 32, the arm cylinder 34 and the bucket cylinder 36 respectively, as shown in FIG. 9. These displacement sensors 13a, 14a, 25a, 32a, 34a and 36a can detect displacements or rotation angles of the corresponding hydraulic cylinders or hydraulic motors. The excavation state determination portion 505 or the swinging side pressing state determination portion determines an excavation state or a non-excavation state of the working device 30 not based on the operation amounts of the levers 201 but based on displacement of the boom cylinder 32 etc. detected by the displacement sensor 32a etc. and the discharge pressure of the hydraulic pump 41. Incidentally, although the displacement amount of each hydraulic actuator has been described as the displacement, the invention is not limited thereto but speed or rotation speed may be used alternatively.

According to the third embodiment, similar effects to those of the first and second embodiments can be obtained.

(Fourth Embodiment)

Figure 10:
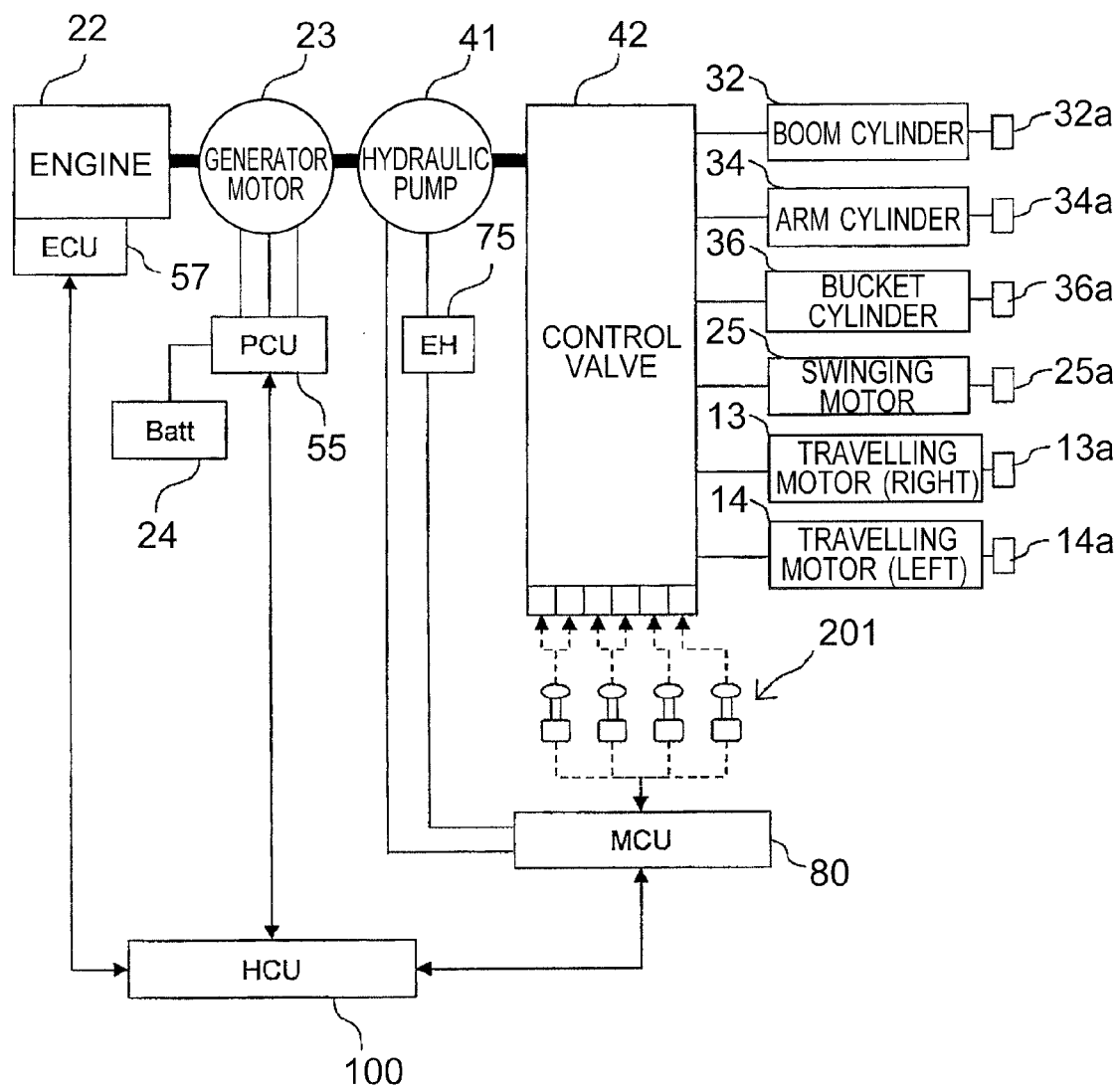
FIG. 10 A system configuration diagram of main electromotive and hydraulic devices of a hydraulic excavator according to a fourth embodiment of the invention.

FIG. 10 is a system configuration diagram of main electromotive and hydraulic devices of a hydraulic excavator according to a fourth embodiment of the invention. The fourth embodiment is different from the aforementioned third embodiment as follows. That is, the assist power of the generator motor 23 is limited in accordance with the pump discharge pressure detected by the pressure sensor 43 and the displacements of the hydraulic actuators detected by the displacement sensors 13a, 14a, 25a, 32a, 34a and 36a in the third embodiment. On the other hand, the assist power of the generator motor 23 is limited only in accordance with the displacements of the hydraulic actuators detected by the displacement sensors 13a, 14a, 25a, 32a, 34a and 36a and the operation amounts of the levers 201. Incidentally, identical or corresponding components to those in the third embodiment are referred to by the same numerals correspondingly and respectively in the fourth embodiment.

Specifically, the displacement sensors 13a, 14a, 25a, 32a, 34a and 36a are attached to the travelling motors 13 and 14, the swinging motor 25, the boom cylinder 32, the arm cylinder 34 and the bucket cylinder 36 respectively in the same manner as in the aforementioned third embodiment. For example, the relief state estimation portion serving as the pressure control device operation state determination portion estimates a relief state of a predetermined hydraulic actuator when a state in which displacement does not change continues for a predetermined time, based on a displacement of the boom cylinder 32 etc. detected by the displacement sensor 32a, rotation angles of the travelling motors 13 and 14 detected by displacement sensors 43, etc. Further, the excavation state determination portion 505 determines a state of an excavation work or a state of a non-excavation work of the working device 30, for example, based on the displacement amount (displacement) of the boom cylinder 32 etc. detected by the displacement sensor 32a and operation amounts of the levers 201.

In the fourth embodiment, for example, even in the case of an electric type excavator or a hybrid excavator (not shown) in which hydraulic actuators are driven by electric type linear actuators or an electric motor, the state of the excavation work or the state of the non-excavation work can be determined from a rotation angle of the electric motor or displacements of the electric type linear actuators. In addition, for example, even in the case of a hybrid type hydraulic excavator in which an electric motor is used as the swinging motor 25, a state of a swinging pressing work or a state of a non-swinging pressing work in the second embodiment can be determined based on a rotation angle of the electric type swinging motor 25 detected by the displacement sensor 25a. Incidentally, although the displacement and the rotation angle are used as the displacement amount in the embodiment, determination may be made based on an actuator speed or a rotation speed detected by a speed sensor.

<Other Embodiments>

Incidentally, the invention is not limited to the aforementioned embodiments but may include various modifications. For example, the aforementioned embodiments have been described in order to make it easy to understand the invention. The invention does not have to be limited to what includes all the aforementioned constituents.

In addition, although an assist operation in the case where an operation for raising/lowering the boom 31 of the working device 30 is performed or in the case where the swinging motor 25 is driven has been described in each of the aforementioned embodiments, assist control of the generator motor 23 described in each of the aforementioned embodiments can be also applied to the case where the arm 33 or the bucket 35 of the working device 30 is driven and operated or in the case where the travelling motors 13 and 14 are driven and operated.

Accordingly, assist control of the generator motor 23 according to each of the aforementioned embodiments can be also applied, for example, to a wheel loader or a dump truck etc. as long as it is a construction machine provided with hydraulic actuators such as hydraulic cylinders or hydraulic motors. In addition, in the case of the aforementioned fourth embodiment, assist control of the generator motor 23 can be performed also in an electric type excavator in which actuators are driven by an electric motor. Further, the rotation frequency of the electric motor driving the electric type actuators may be detected by a displacement sensor (not shown) in order to perform assist control of the generator motor 23 based on the rotation frequency of the electric motor.

REFERENCE SIGNS LIST 1 hydraulic excavator (construction machine)
2 excavator body (body)
10 lower travelling body
11 crawler (drive portion)
12 crawler frame
13, 14 travelling motor (hydraulic actuator)
13a, 14a displacement sensor (displacement amount detection portion)
20 upper swinging body (drive portion)
21 swinging frame
22 engine
23 generator motor
24 battery (electric storage device)
25 swinging motor (hydraulic actuator)
25a displacement sensor (displacement amount detection portion)
26 swinging mechanism (drive portion)
30 working device (drive portion)
31 boom
32 boom cylinder (hydraulic actuator)
32a displacement sensor (displacement amount detection portion)
33 arm
34 arm cylinder (hydraulic actuator)
34a displacement sensor (displacement amount detection portion)
35 bucket
36 bucket cylinder (hydraulic actuator)
36a displacement sensor (displacement amount detection portion)
37 cabin
40 hydraulic system
41 hydraulic pump
42 control valve
43 pressure sensor (pressure detection portion)
55 PCU
57 ECU
75 proportional solenoid valve
80 MCU (control portion)
100 HCU (control portion)
201 lever (operation device)
301 relief valve (pressure control device)
302 tank
501 rotation frequency command calculation portion
502 maximum output estimation portion
503 pump power estimation portion
504 relief state determination portion (pressure control device operation state determination portion)
505 excavation state determination portion (drive portion work state determination portion)
506 limiter processing portion
507 pump power limiting portion

The invention claimed is:

1. A construction machine comprising:
   a body;
   a drive portion which is attached to the body;
   an engine which is mounted in the body;
   a generator motor which is attached to the engine and which can be driven as an electric generator or an electric motor;
   a hydraulic pump which is driven by the engine and the generator motor;
   a plurality of hydraulic actuators which drive the drive portion with motive power generated by the hydraulic pump;
   a pressure control device which operates in accordance with discharge pressure of the hydraulic pump;
   a pressure detection portion which detects the discharge pressure of the hydraulic pump;
   a plurality of operation devices which generate and output operation signals in order to operate the plurality of hydraulic actuators;
   a control portion which lowers a drive output of the generator motor in accordance with a drive state of the drive portion and limits a drive output of the hydraulic pump in order to keep a rotation frequency of the engine within a range of predetermined values; and
   wherein when an operation amount of the other of the operation devices is within a predetermined range which is set in advance, the control portion determines that the drive portion is in a non-excavation state, and lowers the drive output of the generator motor.

2. A construction machine according to claim 1 wherein:
   when the other one of the operation devices outputs a signal in order to operate a corresponding one of the hydraulic actuators and the displacement amount detected by the displacement amount detection portion is within a predetermined range which is set in advance, the control portion determines that the drive portion is in a non-excavation state, and lowers the drive output of the generator motor.

3. A construction machine according to Claim 2, wherein:
the hydraulic actuators serve as hydraulic cylinders or hydraulic motors.

4. A construction machine according to claim 2, wherein:
when a pressure control device operation state determination portion determines that the pressure control device is not in operation, the control portion drives the hydraulic pump with a drive output of the engine and the drive output of the generator motor; and when the pressure control device operation state determination portion determines that the pressure control device is in operation, the control portion drives the hydraulic pump with the drive output of the generator motor which is lowered in comparison with that when the pressure control device is not in operation.

5. A construction machine according to claim 1, wherein:
the hydraulic actuators serve as hydraulic cylinders or hydraulic motors.

6. A construction machine according to Claim 5, wherein:
when a pressure control device operation state determination portion determines that the pressure control device is not in operation, the control portion drives the hydraulic pump with a drive output of the engine and the drive output of the generator motor; and when the pressure control device operation state determination portion determines that the pressure control device is in operation, the control portion drives the hydraulic pump with the drive output of the generator motor which is lowered in comparison with that when the pressure control device is not in operation.

7. A construction machine according to claim 1, wherein:
the drive portion is configured to be capable of performing a swinging pressing work and a non-swinging pressing work;
the construction machine further comprises:
a pressure control device operation state determination portion which determines an operation state of the pressure control device based on a detection value detected by the displacement amount detection portion or the pressure detection portion; a drive portion work state determination portion which determines whether the drive portion is in a state of the swinging pressing work or in a state of the non-swinging pressing work; and
the control portion lowers the drive output of the generator motor when the pressure control device operation state determination portion determines that the pressure control device is in operation and the drive portion work state determination portion determines that the drive portion is in the state of the non-swinging pressing work.

8. A construction machine according to claim 7, wherein:
when the pressure control device operation state determination portion determines that the pressure control device is not in operation, the control portion drives the hydraulic pump with a drive output of the engine and the drive output of the generator motor; and when the pressure control device operation state determination portion determines that the pressure control device is in operation, the control portion drives the hydraulic pump with the drive output of the generator motor which is lowered in comparison with that when the pressure control device is not in operation.

9. A construction machine according to claim 1, wherein:
when a pressure control device operation state determination portion determines that the pressure control device is not in operation, the control portion drives the hydraulic pump with a drive output of the engine and the drive output of the generator motor; and when the pressure control device operation state determination portion determines that the pressure control device is in operation, the control portion drives the hydraulic pump with the drive output of the generator motor which is lowered in comparison with that when the pressure control device is not in operation.

\* \* \* \* \*